Figure 1:
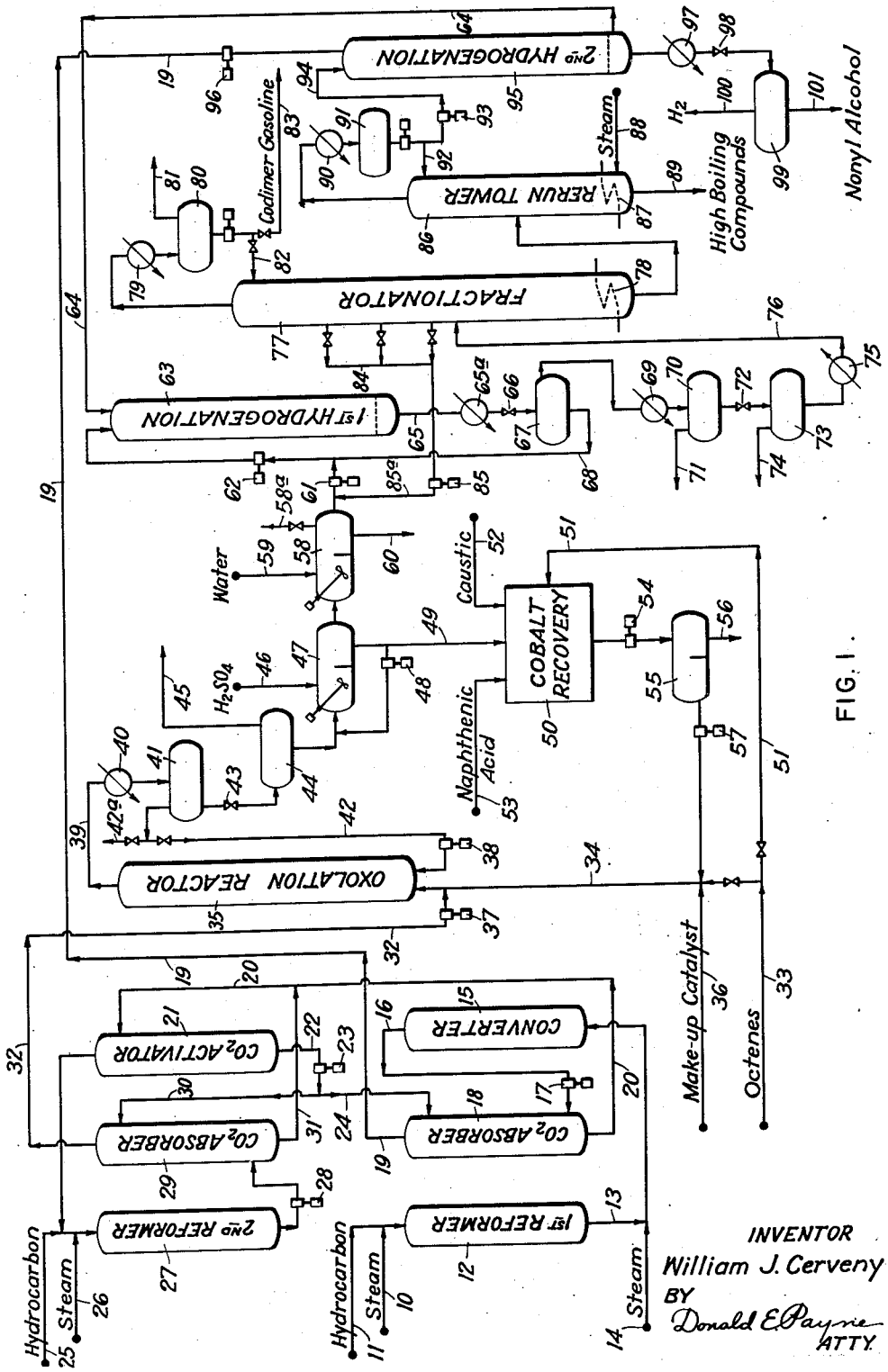

May 12, 1953 W. J. CERVENY 2,638,488
PRODUCTION OF HIGH ALCOHOLS BY IMPROVED OXO PROCESS
Filed Sept. 13, 1951 2 Sheets-Sheet 1

INVENTOR
William J. Cerveny
BY
Donald E. Payne
ATTY.

May 12, 1953 W. J. CERVENY 2,638,488
PRODUCTION OF HIGH ALCOHOLS BY IMPROVED OXO PROCESS
Filed Sept. 13, 1951 2 Sheets-Sheet 2

INVENTOR
William J. Cerveny
BY Donald E. Payne
ATTORNEY

Patented May 12, 1953

2,638,488

UNITED STATES PATENT OFFICE 2,638,488

PRODUCTION OF HIGH ALCOHOLS BY IMPROVED OXO PROCESS

William J. Cerveny, Lansing, Ill., assignor to Standard Oil Company, Chicago, Ill., a corporation of Indiana Application September 13, 1951, Serial No. 246,433

12 Claims. (Cl. 260—638)

This invention relates to improvement in production of high boiling alcohols and it pertains more particularly to improved methods and means for producing high boiling alcohols which are substantially free from aldehydes and from other impurities which have heretofore contaminated such alcohols produced by the so-called oxo process. This is a continuation-in-part of copending prior application, Serial Number 20,753, filed April 13, 1948, and now abandoned; certain subject matter described herein is claimed in companion application, Serial Number 246,368, in the name of L. W. Russum and R. J. Hengstebeck, filed September 13, 1951, which, in turn, is a continuation-in-part of Serial Number 20,786, filed April 13, 1948, now abandoned.

In the oxo process an olefin, such for example as heptene or octene, is reacted with carbon monoxide and hydrogen at high pressure in the presence of a carbonyl forming metal catalyst such as cobalt to yield an aldehyde with one more carbon atom per molecule. This reaction is referred to as oxolation and it is accompanied by side reactions which include a certain amount of hydrogenation to form alcohols, aldehyde polymerization and formation of relatively high boiling products of indeterminate composition. The second step of the oxo process is the hydrogenation of products produced in the first step primarily to convert the aldehyde into alcohol after which the hydrogenated products are fractionated into an alcohol fraction (nonyl alcohol when the charged olefin is an octene), a lower boiling hydrocarbon fraction and a higher boiling fraction. The alcohol fraction thus obtained is usually discolored and contaminated with about .5 to 3% of aldehyde and other impurities which are objectionable and which render the alcohol unsuitable for important uses. An object of this invention is to provide a method and means for producing by a modified oxo process an alcohol which is not discolored and which is substantially free from aldehydes and other impurities.

A further object is to provide improvements in the oxo process whereby product degradation is reduced to a minimum and whereby maximum yields of high quality products may be obtained with a minimum investment and operating costs. Another object is to provide improved catalyst materials and improved methods of catalyst utilization.

Another object is to provide a method and means for effecting product hydrogenation with hydrogen containing about .2 to .3% or more carbon monoxide whereby the expense of hydrogen production and purification may be reduced to a minimum. Still another object is to increase the effectiveness of hydrogen utilization.

An important object of the invention is to minimize reduction of alcohols to hydrocarbons in the oxolation product hydrogenation step and to minimize saturation of olefins present in oxolation products. Other objects will be apparent as the detailed description of the invention proceeds.

To accomplish the above objects a normally gaseous hydrocarbon is reacted with steam in a multiple reformer system, the products of the first reformer being passed through a converter with additional steam to produce a gas consisting essentially of hydrogen and carbon dioxide. This carbon dioxide is separated and reacted with hydrocarbons and steam in the second reformer to produce carbon monoxide and hydrogen in about a 1:1 ratio together with carbon dioxide which is separated and recycled. The hydrogen produced in the first reformer and converter, after removal of $CO_2$, will usually contain about 1 to 2% of carbon monoxide.

The 1:1 hydrogen-carbon monoxide mixture (ratios as high as 1.3:1 may be used) is passed through an oxolation reaction zone together with an aliphatic olefin containing about 3 to 15 or more carbon atoms per molecule, for example a mixture of heptenes or octenes, in the presence of an oxolation catalyst such as cobalt under conditions to effect substantial oxolation, i. e. conversion of octene to nonyl aldehyde. Where the charge is a mixture of olefins obtained by polymerization of a mixture of n-butenes and isobutylene, the olefins which do not react are generally characterized by highest octane numbers and are the most valuable components for motor fuel. Oxolation may be effected by operating at about 3000 p. s. i. g. at a temperature of about 240 to 400° F., e. g. about 330° F., with a liquid space velocity of about .15 to 1.5, e. g. about .5, employing about .01 to .2 or more, e. g. about .1 weight per cent catalyst as cobalt and about 20 to 50 or more, e. g. about 25 to 40 cubic feet of fresh hydrogen-carbon monoxide gas per gallon of olefin charged. These preferred conditions give a total olefin conversion of about 40–60%, an aldehyde to alcohol ratio of about 3:1 (1:1 to 5:1), an aldehyde-plus-alcohol to bottoms ratio of about 3:1 (2:1 to 17:1) and a low olefin saturation (0 to 10%).

The liquid product of the oxolation step, after catalyst has been removed therefrom by acid washing, may then be subjected to a first hydrogenation step under conditions for converting most of the nonyl aldehydes to nonyl alcohols without converting appreciable amounts of alcohols to hydrocarbons or saturating appreciable amounts of unreacted olefins. This hydrogenation may be effected by trickling the oxolation product over supported cobalt catalyst, preferably about 3 to 15% or about 12% cobalt on pumice, at a temperature of about 350° to 600° F., e. g. about 450° F. and a pressure of about 850 p. s. i. g. or more in the presence of hydrogen from the final hydrogenation step. To remove the heat of hydrogenation and at the same time increase the conversion of aldehydes to alcohols a substantial part of the hydrogenated product may be cooled and recycled.

The hydrogenated product is then fractionated to remove unreacted hydrocarbons and particularly to remove all materials higher boiling than the desired alcohols. The alcohol product thus obtained may contain about .5 to 3% of nonyl aldehydes and other impurities. Such impure nonyl alcohol is subjected to a second hydrogenation step by trickling it over a second hydrogenation catalyst (which may also be cobalt on pumice) at a temperature of about 300° F. to 500° F. and a pressure of about 900 p. s. i. g. or more in the presence of the hydrogen produced as hereinabove described. A large excess of hydrogen is introduced into the final hydrogenation reactor and under the described conditions almost all of the aldehydes are converted into alcohol without appreciably reducing the alcohol to hydrocarbons. Perhaps the small amount of carbon monoxide in the hydrogen, which may be in the range of about 1 to 2%, has some inhibiting effect on alcohol reduction and in view of such carbon monoxide content larger amounts of hydrogenating gas are employed than would otherwise be necessary for obtaining the product of desired purity. However, the hydrogen from the second hydrogenation step is thereafter employed in the first hydrogenation step wherein carbon monoxide content (which is now enhanced) appears to inhibit conversion of alcohols to hydrocarbons and to inhibit saturation of the unreacted olefins. The product produced by the second hydrogenation step is an alcohol of high purity and it is substantially free from discoloration. The use of catalysts and conditions in the second hydrogenation step may be such as to effect complete removal of aldehydes and other impurities. In some cases, particularly with nickel catalyst, as much as 2 or 3% of the alcohols may be reduced to hydrocarbons, but this reduces the alcohol yield and requires a subsequent distillation step.

Regardless of catalyst and severity employed in the first hydrogenation step, the nonyl alcohol fraction recovered from the hydrogenated products always appears to be contaminated with excessive amounts of aldehydes and other impurities. Rehydrogenation is ineffective for obtaining a product of the desired purity in the absence of the intervening fractionation step. Apparently the oxolation product contains high boiling components which interfere with the action of the catalyst. Possibly, for example, aldehyde polymers are formed which are not reduced in the first hydrogenation step and which depolymerize in the distillation step. Regardless of the possible explanation of the phenomena it has been found that the intervening fractionation between the two hydrogenation steps is of great value for obtaining a product of the desired properties. The first hydrogenation reduces a substantial portion of the aldehydes and thereby facilitates the fractionation without decomposition. The fractionation step in turn removes high boiling materials, the exact composition of which is not known but the removal of which enables the production of a high quality product in the final hydrogenation step.

Some hydrogenation may be effected in the oxolation step itself and such hydrogenation may take the place of the "first hydrogenation step" hereinabove referred to, if the liquid products of the oxolation step are acid-washed to remove cobalt, water washed to remove acid, then steam distilled at subatmospheric pressure at a sufficiently low temperature and short contact time to avoid appreciable product degradation. In this case the heart cut subjected to final hydrogenation preferably consists almost wholly of aldehydes and alcohols of the desired number of carbon atoms ($C_8$ aldehydes and alcohols when heptene is the charge or $C_9$ aldehydes and alcohols when octene is the charge) although the removal of lighter components is not as essential as the removal of the heavier, higher boiling components. In this embodiment of the invention, the final hydrogenation is preferably effected at a pressure as high as 3000 p. s. i. and it is necessary to effect cooling in the final hydrogenation step by means similar to that hereinabove described for use in connection with the first hydrogenation step.

While other hydrogenation catalysts such as copper chromite, nickel, etc., may of course be employed, cobalt-on-pumice is of particular advantage because it is not poisoned or deactivated by as much as 2 to 3% of carbon monoxide in the hydrogen stream. Nickel catalysts in general are more active hydrogenation catalysts but when they are employed in the final hydrogenation step there is a greater tendency of reduction of alcohols to hydrocarbons. The cobalt-on-pumice catalyst enables the use of the same hydrogen in both hydrogenation steps and enables the use of hydrogen containing far more carbon monoxide than was heretofore believed to be tolerable.

Figure 2:
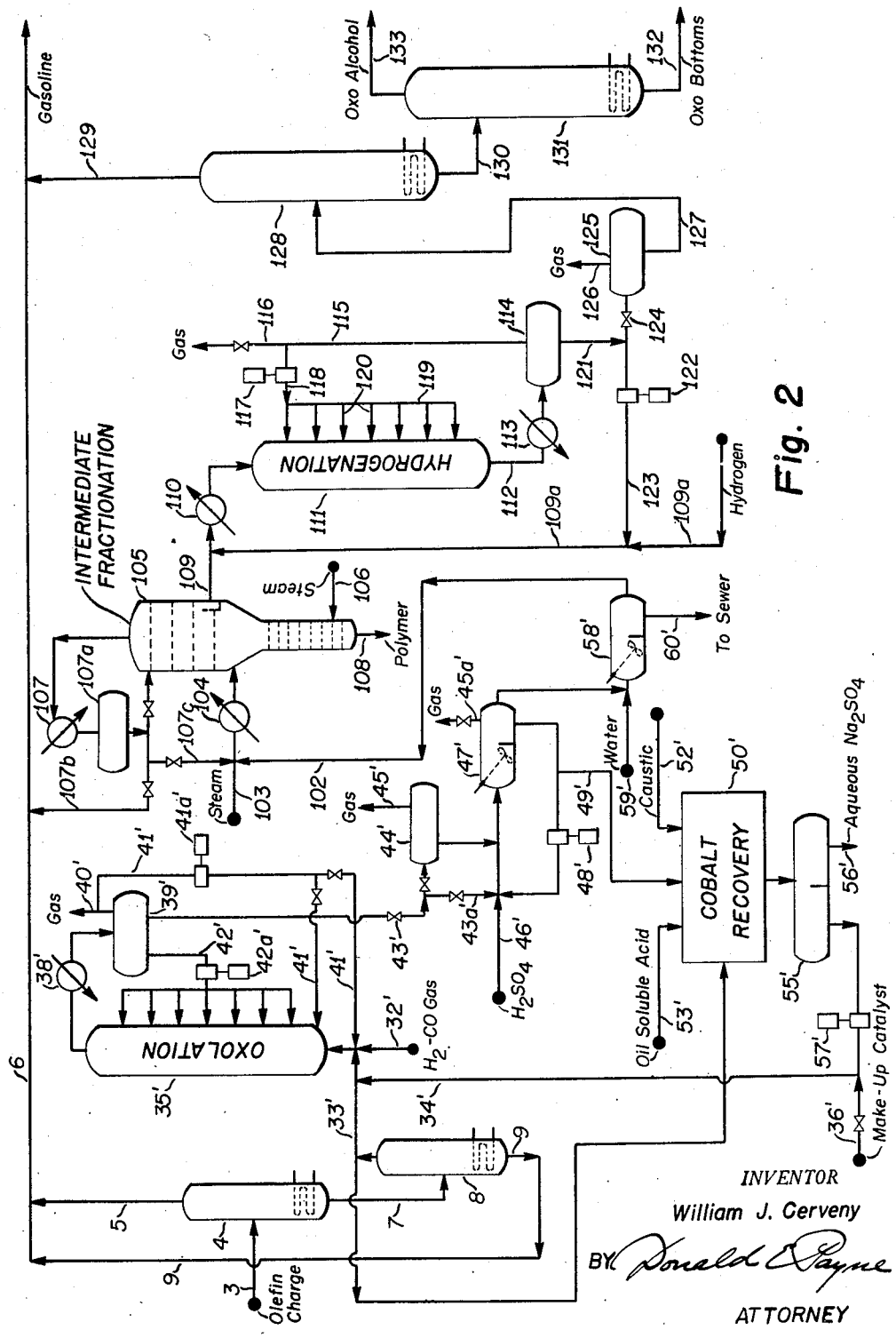

The invention will be more clearly understood from the following detailed description read in conjunction with the accompanying drawings in which:

Fig. 1 is a schematic flow diagram of a commercial plant for producing about 36,000,000 pounds per year of nonyl alcohol, and Fig. 2 is a schematic flow diagram of a commercial plant for producing octyl alcohol.

In order to produce the hydrogen-carbon monoxide 1:1 gas mixture and the hydrogen for the hydrogenation steps, a multiple gas reformer system is employed. A mixture of steam from line 10 and hydrocarbon gas (which has been previously scrubbed with 10% caustic solution and washed with filtered water) from line 11 is passed through first reformer 12 wherein it is heated to a temperature of about 1500 to 1600° F. and contacted with a known reformer catalyst such as reduced nickel promoted with ceria or magnesia (see U. S. 1,904,592) to obtain a product consisting chiefly of $H_2$, $CO$ and $CO_2$. These products are cooled to about 900° F. and introduced by line 13 with additional steam from line 14 into converter 15 wherein the mixture is contacted with a conversion catalyst such as iron oxide, which may be promoted with $CaO$, $MgO$, $Cr_2O_3$ and/or other known promoters, for converting the $CO$ and steam to $CO_2$ and $H_2$. The products from the converter, after condensing and separating out water, are introduced by line 16 and compressor 17 into CO₂ absorber 18 wherein the CO₂ is scrubbed out with a lean MEA (monoethanolamine) solution at about 100° F. and 235 p. s. i. g. so that the gas discharged through line 19 consists essentially of hydrogen although it usually contains about 1 to 2% of carbon monoxide, i. e. has an H₂ : CO ratio of approximately 50:1. The rich MEA solution is introduced by line 20 to the upper part of CO₂ activator tower 21 wherein the CO₂ is stripped out of the solution, the lean solution being returned by line 22, pump 23, coolers (not shown) and line 24 to absorber tower 18.

The CO₂ from the top of tower 21 together with sulfur-free hydrocarbon gas from line 25 and steam from line 26 is contacted with reformer catalyst in reformer 27 likewise operating at about 1500 to 1600° F. and the resulting products, after cooling and separating water, are then passed by compressor 28 to CO₂ absorber 29 into which lean MEA solution is introduced by line 30. Enriched MEA solution from the bottom of tower 29 passes by line 31 and line 20 to CO₂ activator tower 21 so that the carbon dioxide in this stream supplements the carbon dioxide from the stream leaving absorber 18 to supply the required amount of CO₂ for reformer 27. By the above procedure approximately 1,200,000 cubic feet per day of an approximately 1:1 gas mixture of H₂ : CO is produced and discharged through line 32 while about 950,000 cubic feet per day of a gas consisting essentially of hydrogen but containing about .5 to 3% carbon monoxide is produced and discharged through line 19.

While the invention is applicable to the production of higher alcohols generally, i. e. alcohols containing from about 4 to 16 or more carbon atoms per molecule, it will be described in Fig. 1 as applied to the production of nonyl alcohol. In this case a mixture of octenes is obtained by dimerization of olefins contained in a butane-butylene stream by means of a polymerization catalyst such as phosphoric acid on kieselguhr. The resulting octenes are separated from higher boiling components by fractional distillation. About 2050 gallons per hour (measured at 60° F.) of the butylene dimer codimer charge is introduced by line 33, the major part of the charge being pumped to a pressure of 3000 p. s. i. g., preheated to about 330° F. and introduced by line 34 to oxolation reactor 35 and a minor portion (about 75 gallons per hour) being employed for catalyst recovery as will hereinafter be described.

While a variety of catalyst are known to effect the oxolation reaction, the preferred catalyst in this case is cobalt which is introduced in the form of an oil-soluble cobalt salt, preferably cobalt naphthenate, but which evidently functions as cobalt carbonyl. Make-up catalyst may be introduced through line 36 as a 6% cobalt naphthenate solution but most of the catalyst is recovered from oxolation products and recycled as a cobalt naphthenate solution as will be hereinafter described. About 85 gallons per hour of total catalyst solution is introduced into the oxolation reactor which corresponds to about .11 weight per cent cobalt based on olefin charge. The hydrogen-carbon monoxide gas stream is introduced into the oxolation reactor by compressor 37, this stream being supplemented by gases recycled by compressor 38. Oxolation is effected at a pressure of about 3000 p. s. i. g. at a temperature of about 330° F. and a liquid space velocity of about .4 to 1 in unpacked tower reactor 35 which may be about 2½ to 3 feet in diameter by about 40 feet in height. Other oxolation temperatures of the order of 250 to 450° F. may be employed with space velocities of the order of .4 to 1. The effluent liquid product stream from the oxolation reactor may consist of about 60% unreacted olefins, about 24% of nonyl aldehydes, 7% nonyl alcohols and 9% higher boiling materials although with proper catalysts and operating conditions the amount of aldehydes may be increased and the amount of high boiling material decreased.

The products leaving the oxolation reactor through line 39 are cooled to about 100° F. in cooler 40, and are introduced into separator 41 from which part of the separated gases may be recycled through line 42 by compressor 38 and the rest may be continuously or intermittently purged through line 42a. Cooling of the reactor may be effected by recycling of cooled reactor effluent fluids at spaced levels in the reactor or by use of any other cooling means known to the art.

Liquids from separator 41 are passed through a pressure reducing valve 43 or a throttle system to a low pressure separator 44, which may operate at about 40 p. s. i. g. from which gases are discharged through line 45. Most of such gases may be recycled to the inlet of compressor 28 and the remainder may be vented, burned, or utilized elsewhere.

Liquid from the low pressure separator is then washed with a 5% sulfuric acid solution which may be introduced at the rate of about 60 to 65 gallons per hour from line 46. The washing may be effected in one compartment of a horizontal wash drum 47 provided with a suitable stirrer (not shown), the other portion of the wash drum serving as a separator or settler, but any effective system for mixing and separating may be used. About 480 gallons per hour of the settled acid may be recycled by pump 48 the remaining 65 gallons per hour of cobalt sulfate and acid solution being introduced by line 49 to cobalt recovery system 50 into which about 75 gallons per hour of hydrocabon (olefin charging stock) is introduced by line 51, about 40 gallons or more per hour of 10% caustic solution is introduced by line 52 and about 15 to 20 gallons per hours of naphthenic acid is introduced by line 53. The cobalt recovery system may comprise a simple cylindrical vessel provided with a stirrer the net reaction being a conversion of the cobalt sulfate to cobalt naphthenate, which reaction proceeds almost quantitatively because the cobalt naphthenate is dissolved in the introduced hydrocarbon. The total mixture from this vessel is introduced by pump 54 into separator 55 from which sodium sulfate solution is withdrawn by line 56. The cobalt naphthenate solution may be washed with water in further mixing and separating zones (not shown) to remove all sodium sulfate and any excess caustic. The solution is then introduced into the oxolation reactor by pump 57 and line 34 together with any make-up cobalt naphthenate that may be required.

The acid-washed product from tank 47 is introduced into water wash vessel 58 wherein it is washed with filtered water introduced through line 59, the wash water being withdrawn by line 60. A plurality of washing steps may of course be employed.

The washed products of oxolation are then introduced by pump 61 through preheaters (not shown) and by pump 62 to first hydrogenation reactor 63 into which hydrogen is introduced from line 64. Hydrogenation may be effected in a single reactor or in a plurality of reactors connected in parallel and it is effected by trickling the liquid over a bed or beds of cobalt-on-pumice catalyst. This catalyst may be prepared by dissolving about 35 parts by weight of heated cobalt nitrate hexahydrate in about 12 parts by weight of distilled water, adding about 50 to 60 parts by weight of pumice (about 2 to 8 mesh or ⅛ to ¼ inch particle size), thoroughly mixing, evaporating the water, decomposing the deposited cobalt nitrate to cobalt oxide and reducing with hydrogen at about 550 to 800° F. for a period of hours. The catalyst is preferably charged to the reactor before the reduction step, is heated with steam to approximately reduction temperature and then reduced with hydrogen at about atmospheric pressure before the reactor goes on stream. The amount by weight of cobalt based on total catalyst must be more than 3% but need not exceed 9 or 10%, about 6 to 8% being preferred. The hydrogen employed is that which has previously been utilized in a subsequent hydrogenation step and it may contain about .2 to 3% of carbon monoxide (as well as small amounts of methane and alcohol) about 900,000 cubic feet per day of said gas being employed, i. e. about 15 to 20 cubic feet per gallon of liquid charged.

The first hydrogenation step is effected at about 850 p. s. i. g. or more and at a temperature of about 400 to 550° F., e. g. about 450° F. under which conditions most of the aldehydes are converted into alcohols, no substantial amount of the alcohols are converted into hydrocarbons, and a minimum amount, i. e. less than 10 or 15%, of the unreacted olefins are saturated. The liquid space velocity will depend somewhat upon the catalyst employed although the pumice has only a minor effect on the hydrogenation rate of nonyl aldehyde. Space velocities should be in the range of about .1 to .4 based on incoming oxolated liquid or about .2 to 1.2 based on total volumes of liquid charged per hour per volume of catalyst space and should be such as to avoid substantial reduction of alcohols to hydrocarbons and sufficient to effect saturation of less than about 15% of the olefin codimers present. Preferably the conditions should be such as to effect about 90 volume per cent conversion of the aldehyde to alcohol.

The liquid leaving the base of the hydrogenaation reactor or reactors through line 65 may be at a temperature of about 480 to 500° F or more due to the exothermic nature of the hydrogenation. The hot liquid passes through cooler 65a and pressure release valve 66 to recycle separator 67 which may be operated at about 335 p. s. i. g. and approximately 450° F. About 5000 gallons per hour of liquid from the base of the separator is recycled by line 68 for admixture with the approximately 2200 gallons per hour of washed charge from pump 61 and the preheaters. By thus using a recycle ratio of about 2:1 to 3:1 the temperature rise in reactor 63 may be minimized. The cooling and separation at lower pressure is essential for proper operation of pump 62. Liquids and gases from the upper part of separator 67 are withdrawn through cooler 69 to separator 70 which may operate at about 335 p. s. i. g. and about 100° F. and from which additional gas is withdrawn through line 71. The 600,000 cubic feet or more per day of hydrogen withdrawn at this point may be employed in other refinery units such as hydrogenation, hydroforming of coke still naphtha, desulfurization over cobalt molybdate catalyst, etc. Where a source of carbon monoxide is available this gas may be admixed with carbon monoxide and employed in the oxolation step.

From separator 70 the product stream passes through pressure reducing valve 72 to low pressure separator 73 which operates at about 30 to 40 p. s. i. g. and from which additional hydrogen is vented through line 74. The low temperature and low pressure gas separation is for effecting substantially complete degasification and for avoiding loss of products with vented gas. Gases may be vented at higher temperature with a condenser for preventing loss of product, but the above system provides a more complete removal of hydrogen.

The separated product, about 2400 to 3000 gallons per hour, then passes through heater 75 and line 76 to fractionator 77 which is provided with reboiler 78 at its base. The fractionator is preferably operated at subatmospheric pressure, i. e. about 10 p. s. i. g. with a bottom temperature of about 375° F. and a top temperature of about 220° F. The overhead is cooled in condenser 79 and introduced into receiver 80 from which gases and vapors are discharged through line 81 by means of an ejector for maintaining the partial vacuum. Part of the liquid from receiver 80 is recycled as reflux through line 82 and the remainder withdrawn through line 83. About 1200 gallons per hour of codimer gasoline is thus withdrawn from the system.

It has been found that a side stream withdrawn from fractionator 77 between the said inlet and the top of the tower is richer in aldehydes than a stream which is being introduced into the fractionator. About 10 to 35% of the oxolation product or, in other words, about 200 to 800 gallons per hour of such side stream, is therefore withdrawn through one of the branched trap-out lines 84 and returned by pump 85 and line 85a to hydrogenation reactor 63. The recycle of this particular material to the hydrogenation reactor offers many advantages. It decreases the amount of aldehydes removed with codimer from the top of tower 77 and the amount of aldehydes which must be hydrogenated in the second hydrogenation step. It increases the effectiveness of the first hydrogenation reactor by decreasing the relative amount of high boiling material which would have to be returned thereto if the total recycle was via line 68. It greatly reduces the amount of hydrogenation that must be effected in the final step.

The alcohol and high boiling components are removed from the bottom of fractionator 77 and introduced to rerun tower 86 which is provided with reboiler 87 and stripping gas inlet 88 and from which high boiling components are withdrawn through line 89. Stripping should be effected with an inert gas, such as hydrogen. The nonyl alcohol fraction is condensed in coolor 90 and introduced into receiver 91 from which a part is returned as reflux through line 92 and another part is pumped to a pressure of about 900 p. s. i. g. by pump 93 and introduced by line 94 to second hydrogenation reactor 95. The catalyst in this second reactor may be the same as in reactor 63 and this second hydrogenation is preferably effected at a pressure of about 900 p. s. i. g., at a temperature of about 400° F., the liquid space velocity being about the same as that employed in the first hydrogenation, namely, about .2 to 1.0 volume of liquid per hour per volume of catalyst space. The hydrogen is introduced into reactor 95 by line 19 and compressor 96, the unused and undissolved hydrogen being vented from the base of the reactor through line 64 for use in the first hydrogenation reactor 63. Approximately 700 gallons per hour of the impure nonyl alcohol is thus introduced into reactor 95 and approximately 50 to 60 cubic feet of hydrogen is introduced thereto per gallon of impure product to be treated.

The hydrogenated product is cooled in cooler 97 and introduced through pressure reducing valve 98 to separator 99 from which hydrogen is vented through line 100 and the final nonyl alcohol is withdrawn through line 101. The nonyl alcohol thus produced is usually of marketable grade without any further treatment but if the hydrogenation in reactor 95 is of such severity as to reduce any alcohols to hydrocarbons, a subsequent distillation step may be required.

It should be emphasized that the fractionation step between the two hydrogenation steps is of great importance because nonyl alcohol of desired purity cannot be quantitatively obtained by fractionating the products from the first hydrogenation step regardless of the severity of conditions employed therein. It appears that the oxolation reaction products contain substances which either inhibit the action of the hydrogenation catalyst or which release further amounts of aldehyde in the distillation step. Regardless of the explanation, it has been found that a rehydrogenation after the removal of components higher boiling than nonyl alcohol results in a product which is substantially free from aldehydes, color bodies or other impurities. While relatively pure nonyl alcohol can be obtained from the products of the first hydrogenation step by distillation under carefully controlled conditions (preferably under greatly reduced pressure) product yields are not as high as are obtainable by rehydrogenation.

Another important feature is the utilization of hydrogen containing as much as .2 to 3% or more of carbon monoxide. The cobalt-on-pumice catalyst has been found to retain its activity almost indefinitely and to be remarkably effective in reducing aldehydes to alcohol without converting alcohols to hydrocarbons. It is possible that the carbon monoxide content of the hydrogen may itself contribute to a considerable extent to the selectivity of the hydrogenation which is thus effected. Another contributing feature is the use of the large amount of hydrogen in this final hydrogenation step, much more than would theoretically be required. Much greater product purity is obtained by using the entire amount of hydrogen in reactor 95 than could be obtained by using only half of the available hydrogen in this reactor and the other half for reactor 63. By introducing all of the hydrogen into reactor 95 and then utilizing unconsumed hydrogen from reactor 95 for effecting hydrogenation in reactor 63, extremely advantageous results are obtained. The carbon monoxide content of the hydrogen leaving reactor 95 is somewhat greater than that of hydrogen introduced thereto which itself is surprising since in the hydrogenation of butylene dimers over nickel catalysts the carbon monoxide content of the hydrogen is largely converted by the catalyst to methane.

In Fig. 2 I have illustrated a system for the production of octyl alcohol from heptenes. The olefin feed introduced through line 3 is a polymer gasoline which consists essentially of $C_5$ to $C_{12}$ olefins and boils in the range of about 100 to about 400° F. Such feed is introduced into fractionator 4 which is provided with conventional reboiler and reflux means and which is operated to remove the $C_5$ and $C_6$ olefins as an overhead vapor stream to gasoline line 6. The bottoms from fractionator 4 are introduced by line 7 into fractionator 8 from which $C_8$ and higher olefins are withdrawn as bottoms through line 9 and added to gasoline line 6. The $C_7$ olefins withdrawn from the top of fractionator 8 preferably contains not more than 1% of $C_6$ olefins and not more than 2% of $C_8$ olefins. About 290 barrels per day of such $C_7$ olefin stream is introduced by line 33' to oxolation reactor 35' together with about 430,000 cubic feet per day of hydrogen and carbon monoxide (in a mol ratio of 1:1 to 1.3:1) through line 32' and about 3½ barrels per day of cobalt catalyst solution through line 34'. The catalyst in this case is a 6% cobalt naphthenate solution in $C_7$ olefin employed in such amounts as to provide about .1 weight per cent of cobalt based on the total $C_7$ olefins charged, but other oil-soluble cobalt salt may be employed.

The oxolation reactor is operated at 3000 p. s. i. g., about 325° F., and about .5 space velocity to obtain a 60% conversion of the olefin feed, 10% of said feed being reduced to $C_7$ paraffin, about 30% being converted to $C_8$ aldehyde, about 8% to $C_8$ alcohol and about 12% to polymer. The temperature control is effected as described in connection with Fig. 1, about 3 or 4 volumes of product liquid being recycled for each volume of olefin feed introduced. The reactor effluent is cooled in exchanger 38' and separated in receiver 39' into liquid and gas components. Some of the separated gas is vented through line 40' and the remainder is recycled through line 41' by compressor 41a' for reintroduction at the point of olefin inlet at the base of the reactor. A part of the separated cool liquid is recycled through line 42' by pump 42a' to points in the reactor above the base thereof.

The net product liquid from high pressure receiver 41' passes through release valve 43' to low pressure separator 44' which operates at about 30 p. s. i. g. and about 100° F., liberated gas being vented to a fuel line through line 45'. The product liquid, about 300 barrels per day containing approximately 11.4 mols per hour of aldehyde and alcohol are admixed with about 10% sulfuric acid from line 46' and intimately mixed therewith with approximately one hour holding time in the mixing section 47'. A part of the separated acid may be continuously recycled by pump 48' while another part is continuously withdrawn through line 49' for recovery of the catalyst component. Due to the reaction of about half of the acid to form cobalt sulfate, the actual acid strength in the acid washing and separation stage may be only about 5%.

As in the previous example, the extract withdrawn through line 49' is introduced to cobalt recovery sytem 50', the cobalt being present in the extract as an aqueous solution of cobalt sulfate regardless of the particularly oil-soluble cobalt salt which is employed in the catalyst solution. While cobalt naphthenate is the preferred cobalt soluble salt, I may employ cobalt "tallate" (the cobalt salt of acids contained in the tall oil by-product obtained in paper manufacture), cobalt stearate, cobalt oleate or any other cobalt salt which is soluble in the hydrocarbon charged to the oxolation reactor. By contacting the extract from line 49' with an alkali metal hydroxide solution, such as sodium hydroxide, potassium hydroxide, lithium hydroxide or any equivalent thereof, in the presence of an oil-soluble acid such as naphthenic acid, "tallic" acids, stearic acid, or a preferentially oil-soluble carboxylic acid and also in the presence of a hydrocarbon diluent such as a part of the olefin feed to the oxolation reactor, water-soluble alkali metal sulfates are obtained and the cobalt is recombined with the oil-soluble acid which in turn is dissolved in the hydrocarbon diluent. The aqueous alkali metal sulfate can then be separated and withdrawn through line 56' while the diluted oil-soluble cobalt salt is returned by pump 57' to line 34' for further use in the process, any necessary make-up catalyst being introduced by line 36'.

After catalyst removal from the oxolation product stream by acid wash, said stream is washed in mixer 58' with water introduced by line 59', the waste water being discarded through line 60'. It is important in this case not only that catalyst be eliminated from the oxolation product stream but also that the product stream then be freed from acid before it is subjected to further treatment. Dilute caustic may be added to the wash water to insure that the washed product has a pH of about 7.

After acid washing to remove cobalt catalyst and water washing to remove acid, the oxolation effluent stream is passed by line 102 with steam from line 103 through exchanger 104 where it is heated to about 200° F., and thence to an intermediate level in fractionator 105 which in this case is operated at a pressure of about 180 to 220 mm. of mercury. That portion of fractionator 105 which is above the feed inlet is preferably of larger diameter than the portion below the feed inlet since it is desirable to effect as much flash distillation as possible. Thus the fractionator portion of the tower may be about 6 feet in diameter by 31 feet tall, while the stripping section is about 3 feet 6 inches by 11 feet. Additional stripping steam may be introduced at the base of the narrowed section of tower 105 through line 106. The tower should be operated with as low a pressure and with as short a contact time as is economically feasible and the tower bottom temperature should not exceed about 250° F.

Components lower boiling than $C_8$ aldehydes (chiefly unconverted $C_7$ and $C_7$ olefins which have been saturated) are withdrawn from the top of the tower through cooler 107 to receiver 107a from which about 120 barrels per day is passed by line 107b to gasoline line 6, about 510 barrels per day is returned to the top of tower 105 to serve as reflux and about 1340 to 1350 barrels per day is recycled by line 107c for admixture with streams being introduced by line 102 and 103 to preheater 104. The recycle of about 4 or 5 volumes of $C_7$ hydrocarbons per volume of fresh feed to the fractionator-preheater makes it possible to limit the tower inlet temperature to about 200° F. and the tower bottom temperature to 250° F. and to obtain effective flash vaporization of the $C_8$ aldehyde-alcohol components while minimizing the loss of aldehyde by aldol condensation and avoiding the mechanical difficulties in the tower which could result from the condensation of water on the trays which are employed therein if steam alone were used to meet these temperature limitations. While the recycle of $C_7$ hydrocarbons is particularly advantageous for providing a combined heat carrier and stripping medium, other known methods may be employed for effecting flash distillation-stripping operation provided that the temperature requirements are met so that substantially all materials higher boiling than $C_8$ alcohol can be withdrawn from the bottom of tower 105 through line 108 and so that the stream which is withdrawn from a trap-out plate above feed inlet through line 109 will consist essentially of $C_8$ aldehyde and alcohol which is substantially free from higher boiling materials. From the standpoint of product quality, it is not essential to remove all components lower boiling than $C_8$ aldehyde. If all of the lower boiling components are retained with the $C_8$ aldehyde-alcohol fraction, the load on the subsequent hydrogenation tower may be increased to an undesirable extent and in this example, the heart cut withdrawn through line 109 may contain as much as 10 or even 20 mol per cent of $C_7$ hydrocarbons (chiefly olefins).

By the intermediate fractionation step about 150 barrels per day of $C_8$ aldehyde-alcohol (containing about 10 to 20% $C_7$ hydrocarbon) is withdrawn for hydrogenation. This fraction is heated in reactor furnace 110 together with make-up and recycled hydrogen from line 109a and introduced into reactor 111 which in this case is operated at a pressure of 3000 p. s. i. g. and at a temperature in the range of 350 to 550° F., e. g. about 450° F. The catalyst is preferably 3 to 15%, e. g. about 12% cobalt on pumice. With a fresh feed liquid space velocity of about 0.1 to 1.0, e. g. about .25, the olefins are completely saturated and the hydrogenation of the aldehydes is substantially complete. The hydrogenation reactor effluent is withdrawn through line 112, cooled in exchanger 113 and introduced into separator 114 from which separated hydrogen is withdrawn by line 115, vent line 116 being usually closed. The cooled hydrogen is compressed by compressor 117 and returned by line 118, manifold 119 and spaced inlets 120 to prevent a temperature rise of more than 25° F. in any part of the reactor. About one volume of the cooled liquid product withdrawn through line 121 is recycled by pump 122 and line 123 for each volume of heart cut fraction introduced by line 109. In this case about 16 mols per hour of fresh hydrogen is introduced by line 109a.

The net hydrogenation product passes through pressure reducing valve 124 and is introduced into low pressure separator 125 which is maintained at about 30 p. s. i. g. and at about 125° F. Liquid from this separator is introduced through line 127 to fractionator 128 which is provided with usual reboiler and reflux means and materials boiling lower than oxo alcohol (chiefly hydrogenated olefins) are taken overhead through line 129 to gasoline line 6. Bottoms from tower 128 are introduced by line 130 into final fractionator 131 for removing oxo bottoms through line 132 from the final oxo alcohol (octyl alcohol in this case) which is taken overhead through line 133. The iso-octyl alcohol thus produced boils from about 360 to 370° F., has a flash point of about 180° F., is water white, has an aldehyde content which is less than about .2%, may contain a slight amount of iso-heptyl alcohol and iso-nonyl alcohol, depending upon the efficiency of the fractionation of the original olefin feed, but the iso-heptyl alcohol content usually does not exceed .2% and the iso-nonyl alcohol usually does not exceed 2.0%.

While I have described in detail a specific example of my invention, various alternative operating procedures and operating conditions will be apparent from the above description to those skilled in the art. Instead of employing a butylene dimer-codimer mixture as a charge I may employ $C_8$ olefins obtained from catalytically cracked naphtha, from hydrocarbon synthesis or from any other source; in this case the hydrocarbon fraction containing the $C_8$ olefins may be charged to the oxolation reactor and the space velocity modified on account of the large amount of inert paraffins which would then be present. Similarly, a narrow cut $C_5$, $C_6$, $C_7$ or in fact any particular narrow cut olefin fraction of a catalytically cracked hydrocarbon product may be employed, the yield of alcohol in each case depending upon the amount and nature of olefin present. For oxolation, the olefin must have at least one carbon atom attached both to a double bond and to at least one hydrogen atom; however, since olefins which are not oxolatable are isomerized under oxolation conditions into oxolatable form, the invention is applicable generally to olefins having more than three carbon atoms per molecule.

Production of high boiling materials in the oxolation step may be inhibited to a certain extent by employing about 1 to 10% by weight of copper based on cobalt or other carbonyl-forming metal. When supported catalysts are employed the copper may be deposited on the same support as the cobalt and when oil soluble catalysts, such as naphthenates, acetates, oleates, etc. are employed the copper may likewise be used in oil soluble form. Thus in the system hereinabove described copper naphthenate may be mixed with the cobalt naphthenate so that in the system there will be about .1 to 1 part of copper for each 10 parts of cobalt.

Where fixed bed catalysts are employed in the oxolation step there is a marked tendency for the carbonyl-forming metal to migrate down stream and in such cases it is preferred to employ a number of oxolation reactors so that the product may always be passed over a support in a "guard" chamber, the chamber from which catalyst has migrated being subsequently placed in "guard chamber" position.

With regard to the hydrogenation catalyst, many of the advantages of my process are obtainable by the use of catalyst other than the preferred cobalt-on-pumice. Tests on other supports such as fused alumina, filtros, silica gel, etc., have shown marked advantages for pumice but such supports may nevertheless be used. Spheres of alumina, porcelain, alumina gel, silica gel, etc. may be employed as supports for cobalt or nickel when their surface is sufficiently rough and/or porous to hold the catalyst coating and prevent catalyst loss by flaking off. When nickel is employed the preferred hydrogenation temperature is in the range of 200 to 300° F. although lower and higher temperatures may be used. Copper chromite, cobalt molybdate and other known hydrogenation catalysts may be employed with appropriate operating conditions but they do not appear to offer the advantages of cobalt-on-pumice.

The nonyl alcohol produced as hereinabove described in connection with Fig. 1 may have a refractive index ($n_D^{20}$) of 1.438, a specific gravity (15.56° C./15.56° C.) of about .843, an aldehyde content of less than .2%, a neutralization number of about .02 milligram of KOH per gram, a color of about 20 Saybolt and an ASTM distillation range (10% to 90% points) of about 193 to 196° C.

An important feature of the invention is the production of alcohols which are substantially free from color bodies and color forming materials. An important use of the alcohols is the preparation therefrom of esters such for example as dioctyl (or dinonyl) phthalate which is a valuable plasticizer. Not only must the alcohol be free from color bodies but it must also be free from materials which cause color formation on phthalation. The APHA color should not exceed 200 and it should preferably be less than 150 in the case of octyl alcohol.

All volumes referred to herein are those measured at 60° F. and atmospheric pressure.

I claim:

1. The method of hydrogenating aldehydes in a liquid stream which also contains lower boiling olefins and cobalt catalyst, which method comprises first freeing said stream from cobalt catalyst, then hydrogenating said stream in the presence of a cobalt-on-pumice catalyst containing about 3% to 15% cobalt in a first hydrogenation zone at a temperature of about 350 to 550° F. and under a pressure in the range of about 500 to 3000 p. s. i. g., with a hydrogenation gas containing an amount of carbon monoxide in the range of about .2 to 3% and sufficient to inhibit hydrogenation of olefins and conversion of alcohols to hydrocarbons, fractionating the liquid effluent from the first hydrogenation step to remove therefrom components which are lower boiling and higher boiling than hydrogenated aldehydes and subsequently hydrogenating the fraction of the hydrogenated aldehyde boiling range with a hydrogen gas which contains a smaller per cent of carbon monoxide than the hydrogenating gas employed in the first hydrogenation step.

2. In the process of producing alcohols by reacting aliphatic olefins having at least three carbon atoms per molecule with a carbon monoxide-hydrogen gas having a mol ratio of about 1:1 in the presence of a cobalt catalyst under conditions for converting a substantial portion but not all of the olefins into aldehydes having one more carbon atom per molecule than the olefins and subsequently converting most of said aldehydes to alcohols by hydrogenation, the improved method of effecting said hydrogenation in two contacting steps with a catalyst consisting essentially of cobalt-on-pumice and containing about 3% to 15% of cobalt, which method comprises first removing cobalt catalyst from the aldehyde stream to be hydrogenated, employing in the first contacting step a pressure of at least about 350 pounds per square inch and a temperature in the range of about 400° to 550° F., with a liquid space velocity in the range of about .2 to 1 and with at least about 20 cubic feet of hydrogen per gallon of aldehyde-containing stream charge, separating hydrogen from the product effluent from the first step, distilling said product effluent to remove therefrom substantially all material higher boiling than the alcohols produced by aldehyde hydrogenation and a part of the unreacted olefins, hydrogenating in a second contacting step an intermediate fraction from the distillation step at a higher pressure than that employed in the first hydrogenation step and employing a large excess of a hydrogen which is contaminated with carbon monoxide in said second contacting step whereby the per cent of carbon monoxide in the hydrogen leaving said second step is greater than that of the hydrogen entering said step and employing the carbon-monoxide contaminated hydrogen from the second contacting step as the hydrogenation gas in the first contacting step.

3. In the process of producing alcohols by reacting aliphatic olefins having in the range of 3 to 15 carbon atoms per molecule with a carbon monoxide-hydrogen gas having a mol ratio of about 1:1 in the presence of a cobalt catalyst under conditions for converting a substantial portion but not all of the olefins into aldehydes having one more carbon atom per molecule than the olefins and subsequently converting most of said aldehydes to alcohols in the presence of unreacted olefins in a liquid stream, the improved method of operation which comprises removing cobalt catalyst from said liquid stream containing said aldehydes and unconverted olefins, then hydrogenating said stream under conditions for effecting conversion of most of the aldehydes to alcohols without converting any substantial amount of alcohols to hydrocarbons and without saturating the major portion of the unreacted olefins, fractionating the effluent liquid stream from said first hydrogenation step for removing materials higher boiling and lower boiling than hydrogenated aldehydes and subsequently hydrogenating the hydrogenated aldehyde fraction in the absence of said higher and lower boiling components under conditions for increasing the purity of the resulting alcohols, said subsequent hydrogenation step being effected in the presence of a hydrogenation catalyst under a pressure of at least about 500 p. s. i. g. and at a temperature in the range of about 350 to 550° F.

4. The method of producing nonyl alcohols which comprises reacting a mixture of octenes with a carbon monoxide-hydrogen gas having a mol ratio of about 1:1 in the presence of a cobalt catalyst at a pressure of about 3000 p. s. i. g. at a temperature of about 330° F., removing catalyst from the reaction products, then contacting said reaction products with a hydrogenation catalyst consisting essentially of cobalt-on-pumice and containing about 3 to 15% cobalt in a first hydrogenation zone at a temperature of about 350° to 550° F. and a pressure of at least about 850 p. s. i. g. with a hydrogen gas containing an amount of carbon monoxide in the range of about .2 to 3%, reducing the pressure on the hydrogenated products and separating gases therefrom, then distilling said products for removing therefrom components both higher boiling and lower boiling than nonyl alcohols in order to obtain a crude nonyl alcohol stream, and hydrogenating said crude nonyl alcohol stream in a second hydrogenation step with a hydrogen of lower carbon monoxide content than the hydrogen employed in the first hydrogenation step for producing substantially pure nonyl alcohols.

5. The method of claim 4 which includes the step of introducing a large excess of hydrogen containing a small per cent of carbon monoxide into said second hydrogenation step, operating said second hydrogenation step at a higher pressure than the first hydrogenation step and employing said pressure difference for introducing hydrogen containing a larger per cent of carbon monoxide from said second hydrogenation step to said first hydrogenation step.

6. In the process of producing alcohols by reacting in a first conversion zone aliphatic olefins having in the range of 3 to 17 carbon atoms per molecule with a carbon monoxide-hydrogen gas having a mol ratio of about 1:1 in the presence of a cobalt catalyst under conditions for converting a substantial portion but not all of the olefins into aldehydes having one more carbon atom per molecule than the olefins while at the same time causing the formation of high boiling materials, in which process at least a part of the aldehydes are hydrogenated prior to a final hydrogenation step, the improved method of operation which comprises removing all cobalt catalyst from the liquid products leaving said first conversion zone by scrubbing said products with sulfuric acid whereby hydrogenation may be effected in the absence of dissolved cobalt carbonyl contained in said liquid products, fractionating liquid products prior to a final hydrogenation step to separate therefrom at least a portion of unreacted low boiling olefins and substantially all of said higher boiling materials and effecting final hydrogenation of only that portion of the product stream from which lower boiling olefins and substantially all high boiling materials have been separated by contacting said portion with a hydrogenation catalyst consisting essentially of cobalt on pumice and containing more than 3 per cent cobalt in a final hydrogenation zone with a hydrogen gas containing a small amount but less than 3 per cent carbon monoxide under a pressure of at least about 500 p. s. i. g. and at a temperature of about 400° F. to about 550° F.

7. The process of claim 6 wherein the reaction in the first conversion zone is effected under conditions to convert about 40 to 60% of said olefins chiefly into aldehydes and alcohols containing one more carbon atom than said olefins, at least about one-fifth thereof being alcohols.

8. The method of claim 6 which includes the step of subjecting liquid product, after the sulfuric acid washing step, to a hydrogenation prior to said fractionating step.

9. The method of claim 6 wherein at least a part of the aldehydes formed in said first conversion zone are hydrogenated in said first conversion zone and a liquid product steam from said zone, after said sulfuric acid washing step, is fractionated by flash distillation and steam stripping at reduced pressure.

10. The method of producing an alcohol which comprises reacting in a first conversion zone an aliphatic olefin having more than three carbon atoms per molecule with a carbon monoxide-hydrogen gas having a mol ratio of about 1:1 in the presence of a cobalt catalyst under such conditions that about 40 to 60% of said olefin is converted chiefly to aldehydes and alcohols formed by hydrogenation of aldehydes, a minor amount of the olefins being converted into higher boiling materials, removing cobalt from the liquid product thus produced by washing said product with sulfuric acid, removing acid from acid-washed liquid, subjecting the washed liquid to flash distillation and steam stripping at reduced pressure to effect removal of substantially all components higher boiling than said alcohol, effecting final hydrogenation of only that portion of the product stream from which high boiling materials have been separated, said final hydrogenation being effected by contacting the separated aldehyde-containing fraction from the flash distillation step with a hydrogenation catalyst in the presence of excess hydrogen gas containing a small amount but less than 3 per cent carbon monoxide under a pressure of at least about 500 p. s. i. g. at a temperature of about 350 to 550° F. and at a space velocity in the range of about .01 to 1 and fractionating the products of the final hydrogenation to obtain a substantially pure alcohol.

11. The method of claim 10 which includes the step of removing at least a part of components lower boiling than the aldehydes as well as substantially all materials higher boiling than said alcohols in the flash distillation step whereby a heart cut consisting chiefly of alcohols and aldehydes is subjected to the final hydrogenation step.

12. The method of claim 10 wherein the hydrogenation catalyst is about 3 to 15 per cent cobalt deposited on pumice.

WILLIAM J. CERVENY.

References Cited in the file of this patent

UNITED STATES PATENTS

| Number | Name | Date |
| --- | --- | --- |
| 2,464,916 | Adams et al. | Mar. 22, 1949 |
| 2,504,682 | Harlan | Apr. 18, 1950 |
| 2,530,989 | Parker | Nov. 21, 1950 |
| 2,525,354 | Hoog et al. | Oct. 10, 1950 |

OTHER REFERENCES

I. G. Farbenindustrie Patent Publications, T. O. M. Reel 36, Items 21 and part of Item 36, Application 172,948 IVd/120, O. Z. 13,599, August 10, 1942. Deposited in Library of Congress, April 18, 1946 (also available in Meyer translation, pp. 47–49).